(12) United States Patent
Castellan

(10) Patent No.: US 8,413,082 B2
(45) Date of Patent: Apr. 2, 2013

(54) METHOD FOR DESIGNING MASKS USED TO FORM ELECTRONIC COMPONENTS

(75) Inventor: Julia Castellan, Trets (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 0 days.

(21) Appl. No.: 13/117,164

(22) Filed: May 27, 2011

(65) Prior Publication Data

US 2011/0302539 A1 Dec. 8, 2011

(30) Foreign Application Priority Data

Jun. 2, 2010 (FR) ..................................... 10 54304

(51) Int. Cl.
*G06F 17/50* (2006.01)
*G06F 19/00* (2006.01)
*G03F 1/00* (2006.01)
*G21K 5/00* (2006.01)

(52) U.S. Cl. ................ 716/52; 716/53; 716/54; 716/55; 716/112; 703/16; 700/110; 700/120; 700/121; 430/5; 378/35

(58) Field of Classification Search .................... 716/52, 716/53, 54, 55, 112; 703/16; 700/110, 120, 700/121; 430/5; 378/35
See application file for complete search history.

(56) References Cited

U.S. PATENT DOCUMENTS

| | | | | |
|---|---|---|---|---|
| 5,930,148 A * | 7/1999 | Bjorksten et al. | ............ | 716/104 |
| 6,564,178 B1 * | 5/2003 | Brummel | ........................ | 703/22 |
| 7,418,693 B1 * | 8/2008 | Gennari et al. | ................ | 716/55 |
| 7,958,472 B2 * | 6/2011 | Wohl et al. | ..................... | 716/106 |
| 8,099,684 B2 * | 1/2012 | Meiring et al. | ................. | 716/50 |
| 8,103,984 B1 * | 1/2012 | Pierrat | ............................. | 716/53 |
| 8,219,943 B2 * | 7/2012 | Cohn et al. | ....................... | 716/52 |
| 2005/0005256 A1 * | 1/2005 | Rittman | ......................... | 716/19 |
| 2005/0022151 A1 * | 1/2005 | Rittman et al. | ................. | 716/19 |
| 2005/0268256 A1 | 12/2005 | Tsai et al. | | |
| 2006/0053400 A1 * | 3/2006 | Meyer et al. | .................... | 716/11 |
| 2006/0062445 A1 * | 3/2006 | Verma et al. | .................. | 382/144 |
| 2008/0022254 A1 * | 1/2008 | Luo et al. | ......................... | 716/19 |
| 2008/0195982 A1 * | 8/2008 | Nahir et al. | ....................... | 716/2 |
| 2009/0007053 A1 * | 1/2009 | Kim | ................................ | 716/21 |
| 2009/0077524 A1 * | 3/2009 | Nagamura et al. | .............. | 716/19 |

OTHER PUBLICATIONS

French Search Report dated Dec. 23, 2010 from corresponding French Application No. 10/54304.
Grobman W et al: "Reticle Enhancement Technology: Implications and Challenges for Physical Design", Proceedings of the 38th. Annual Design Automation Conference. (DAC). Las Vegas, NV, Jun. 18-22, 2001; [Proceedings of the Design Automation Conference], New York, NY : ACM, US, vol. Conf. 38, Jun. 18, 2001, pp. 73-78, XP010552359.

(Continued)

*Primary Examiner* — Phallaka Kik
(74) *Attorney, Agent, or Firm* — Wolf, Greenfield & Sacks, P.C.

(57) ABSTRACT

A method for designing masks adapted to the forming of integrated circuits, including the steps of: (a) forming a first test file including a set of configurations of integrated circuit elements; (b) forming a second test file comprising the elements of the first test file, less the elements corresponding to configurations forbidden by design rule manuals; (c) transforming the second test file by means of a set of logical operations implemented by computing means to obtain a mask file; (d) testing the mask file and, if the test is negative, modifying the design rule manuals; and (e) repeating steps (a) to (d) until the test of step (d) is positive.

20 Claims, 2 Drawing Sheets

OTHER PUBLICATIONS

Moore B et al: *Advanced Non-Disruptive Manufacturing Rule Checks (MRC)*, Proceedings of SPIE—The International Society for Optical Engineering—Photomask Technology 2006 SPIE US, vol. 6349 II, 2006, pp. 634915-1-634915-10, XP002615282.

Keck M et al: *Mask Manufacturing Rule Check: How To Save Money In Your Mask Shop*, Proc. of SPIE—The International Society for Optical Engineering 2001 SPIE US, vol. Sep. 13, 2000, pp. 114-118, XP002615283.

* cited by examiner

# METHOD FOR DESIGNING MASKS USED TO FORM ELECTRONIC COMPONENTS

CROSS REFERENCE TO RELATED APPLICATIONS

This application claims the priority benefit of French patent application number 10/54304, filed on Jun. 2, 2010, entitled "METHOD FOR DESIGNING MASKS USED TO FORM ELECTRONIC COMPONENTS," which is hereby incorporated by reference to the maximum extent allowable by law.

BACKGROUND OF THE INVENTION

1. Field of the Invention

The present invention relates to the designing of masks to be used to manufacture integrated circuits. More specifically, the present invention relates to a method for improving the design of such masks.

2. Discussion of the Related Art

To manufacture integrated electronic circuits, a set of several masks comprising openings defining work areas on the circuit is used. For example, different masks may be successively used to define locations of dopant implantation, of etching, etc.

The manufacturing of the different masks necessary to obtain an integrated circuit implies a relatively high cost. Further, modern integrated circuits may require, for their production, several tens of masks. It is thus essential to properly test the mask generation files before launching the production of the masks, or even the production of the integrated circuits. Especially, the compatibility of the masks, for example, for their superposition, should be optimal. Having to redesign a set of masks, at the last minute before the launching of the production of integrated circuits or after the launching of the production, may imply very large manufacturing delays and costs.

For each electronic component technology, integrated circuit designers should comply with a number of design rules put together in a "Design Rules Manual", or DRM. Such a manual gathers, among other things, sets of rules relative to the superposition or to the juxtaposition of the layers necessary for the forming of the electronic components.

FIG. 1 illustrates a few examples of rules that may be imposed on designers for the forming of integrated circuits. This drawing shows, in hatchings, different areas at the surface of a substrate intended to receive electronic components. Among the rules to be respected for electronic components, the following can be mentioned:

respecting a minimum width W of some elements of the components, for example, the width of MOS transistor gates, the length of a transistor channel;
respecting a minimum space S between different elements, to avoid interferences between these elements, for example, between two metal tracks, or again leakage currents;
respecting a minimum surface area A for some elements.

FIG. 2 illustrates rules that may be imposed by DRMs when several layers are used to form electronic components, at close or superposed locations of a circuit. This drawing shows the design levels from which are formed masks which will subsequently be necessary to the manufacturing of electronic components, LAYER1 for which the contour of the openings is shown in full lines, and LAYER2 having its openings shown in hatched portions.

The examples of rules to be respected may be:

respecting a minimum enclosure E between the edge of the openings of the second mask LAYER2 and the edge of the openings of the first mask LAYER1. This, for example, corresponds to the case of electronic components formed in a well of a specific conductivity type. In this case, for their proper operation, the components should not be formed too close to the edge of the well. This may also correspond to elements which should be formed in superposed fashion: for example, a transistor gate above a well of a specific conductivity type.

respecting a minimum distance D between elements formed by means of second mask LAYER2 with respect to elements formed by means of first mask LAYER1. This, for example, corresponds to the case where the first mask defines a well of a given conductivity type and where the components formed at the level of the openings of the second mask should not be formed too close to this well due to a risk of interactions.

It should be noted that the rules imposed by DRMs may also integrate an alignment error margin to take into account inaccuracies in the mask alignment on manufacturing of the circuits. The rules imposed by DRMs thus eliminate a number of situations with critical sizings, which could not operate properly and which are thus not accessible to designers.

Once the integrated circuits have been designed by the designers, the obtained CAD files should be turned into image files of the masks which will be necessary to form the integrated circuits. To achieve this, logical operations are defined by technologists to be applied to the integrated circuit files.

The logical operations also define all the elements missing for the proper operation of the circuit, which are not available to designers. Indeed, for an easy design of integrated circuits, designers only define some of the elements necessary to the forming of the integrated circuit. For example, in the case of a MOS transistor, designers may define the location of a well of a given conductivity type, and a second well necessary to the proper operation of the transistor may be automatically generated by the logical operations.

The logical operations finally define an optimized shape of the different masks. They may in particular provide to slightly widen the openings formed in the masks to compensate for a possible subsequent narrowing when the mask is being used.

FIG. 3 shows a conventional flowchart of the steps carried out to design integrated circuits, until the manufacturing of the masks used for manufacturing the integrated circuits.

As described hereabove, a first step 10 comprises forming a computer file which is an image of the desired integrated circuit (DESIGN FILE). This file is formed by designers 12 (DESIGNER), in compliance with the rules imposed by integrated circuit DRMs 14 associated with the technology used.

The integrated circuit file is then transformed, by a computer system, at a step 16 (LOP, Logical Operation Processing) and by means of a set of logical operations 18 (LO), to obtain an image file of the masks necessary to manufacture integrated circuits 20 (MASK FILES). The logical operations are especially provided to gather, within a same mask, the regions of the electronic components of the integrated circuits requiring a same processing.

As an example, low-voltage MOS transistors, high-voltage MOS transistors, dual-gate transistors, etc. may be provided on a same integrated circuit. Each of these transistors requires, to be formed, a specific processing, often obtained by a mask differentiation, for example, to form the wells of these different transistors. The logical operations of step 18 are used to generate the right masks according to the different steps to be carried out.

Step 16 of transformation of integrated circuit file 10 into a mask file may return errors, for example, in the case where the density of electronic components on the circuit would be too high, or in the case where there would be an incompatibility with the integrated circuit design rule manual. In this case, it is necessary to revise the transformation formulas 18 (LO) applied in transformation step 16 to validate or invalidate certain configurations provided by the designers.

Once step 18 has been carried out, all masks 20 are visually verified by a technologist (to spot evident errors, for example, of superposition of elements which should not be superposed), then is tested statistically again, at a step 22 (PLC) before the mask production. This last test, performed by a computer system, is a dimensional verification of the generated masks, for example, in comparison with dimensional criteria imposed by mask manufacturers (MRC, Manufacturing Rule Check), or with criteria imposed by integrated circuit manufacturers (PLC, Post Logical Check).

If test step 22 generates errors, a step 24 (ERROR) is provided, to modify logical operations 18 of transformation of step 20 so that the masks fulfill the conditions imposed by the mask manufacturers. This modification step is carried out manually by technologists and may be relatively long. Indeed, among all logical operations, the one having caused the incompatibility with the dimensional criteria imposed by the mask manufacturers should be targeted, and the required operation(s) should then be eliminated.

Once logical operations 18 have been modified, the operation of transformation of the integrated circuit file into a mask file is applied again to the integrated circuit file provided by the designers. If an error still occurs after test step 22, logical operations 18 are modified again and the transformation operation of step 16 is repeated as many times as necessary.

When test step 22 is validated, the masks are sent to production at a step 26 (MASK FAB) and the integrated circuit production may start.

A problem may arise in specific cases where the designers desire to integrate new components in the integrated circuits. "New component" here means an entirely new component or a new adaptation of a known component, for example, the adding of a doped region at a new location of a transistor, the modification of the dimensions of an insulated gate, etc.

When a new component is designed, the integrated circuit in which this component is provided may be transformed according to the method described in relation with FIG. 3 to obtain the set of masks corresponding to this circuit, if this set of masks can be generated with no error. It is generally provided, before performing this transformation, to form a test file in which many configurations of the new component, in interaction with other components, are gathered. This test file is then tested to see if it complies with the rules imposed by the DRMs, after which it is transformed by means of the logical operations. This enables to verify that this new component poses no problem, related to the DRMs, of integration into the desired integrated circuit, but also into other future configurations that may be given thereto.

However, it is possible to have a test circuit comprising new components complying with the conditions imposed by the DRMs, where the transformations of the logical operations pose no problem, with a good post-transformation test regarding the criteria of mask manufacturers, but with finally produced masks which do not provide high-quality components.

This may be due to the fact that the logical operations transforming the integrated circuit file into a mask file may incorrectly process the design of the new component, or may introduce errors during the transformation.

If an erroneous set of masks is used to produce integrated circuits, this may have significant consequences in terms of time and cost, especially if an entire new set of masks has to be designed and manufactured.

It thus cannot be envisaged to detect errors at the end of the mask manufacturing process. A method for limiting as much as possible the need to redesign integrated circuit masks is thus needed.

SUMMARY OF THE INVENTION

An embodiment provides a method for designing integrated circuit manufacturing masks overcoming all or part of the disadvantages of usual methods.

More specifically, an embodiment is a method for designing integrated circuit manufacturing masks implementing particularly efficient test steps.

Thus, an embodiment provides a method for designing masks adapted to the forming of integrated circuits in a considered technology, comprising the steps of: (a) forming a first test file comprising a set of randomly-generated configurations of integrated circuit elements arranged according to layouts that may exceed the cases authorized by design rule manuals; (b) forming a second test file comprising all the elements of the first test file, less the elements corresponding to configurations forbidden by design rule manuals; (c) transforming the second test file by means of a set of logical operations implemented by computing means to obtain a mask file comprising the configuration of the set of masks necessary to obtain the integrated circuit associated with the second test file; (d) testing the mask file and, if the test is negative, modifying and adapting the design rule manuals according to the test result; and (e) reiterating steps (a) to (d) as many times as necessary until the test of step (d) is positive.

An embodiment provides a method for designing masks adapted to the forming of integrated circuits in a considered technology, comprising the steps of: (a) forming a first test file comprising a set of configurations of integrated circuit elements arranged according to layouts that may exceed the cases authorized by design rule manuals, generated by using mathematical models of interaction of segments or of polygons; (b) forming a second test file comprising all the elements of the first test file, less the elements corresponding to configurations forbidden by design rule manuals; (c) transforming the second test file by means of a set of logical operations implemented by computing means to obtain a mask file comprising the configuration of the set of masks necessary to obtain the integrated circuit associated with the second test file; (d) testing the mask file and, if the test is negative, modifying and adapting the design rule manuals according to the test result; and (e) reiterating steps (a) to (d) as many times as necessary until the test of step (d) is positive.

According to an embodiment, step (d) further comprises the step of modifying and adapting the logical operations of transformation of the second test file.

According to an embodiment, step (d) further comprises the step of modifying and adapting the test of the mask file.

According to an embodiment, step (e) is followed by the steps of: (f) forming an integrated circuit file respecting the rules imposed by the modified and adapted design rule manuals obtained by the last reiteration of step (d); and (g) transforming the integrated circuit file into a mask file by applying the logical transformation operations modified and adapted at step (d).

According to an embodiment, step (g) is followed by a step of manufacturing of a set of integrated circuit masks based on the mask file obtained at step (g).

According to an embodiment, the first test file comprises a set of randomly generated configurations of integrated circuit elements.

According to an embodiment, the first test file comprises a set of configurations of integrated circuit elements generated by using mathematical models of interaction of segments or of polygons.

The foregoing and other objects, features, and advantages will be discussed in detail in the following non-limiting description of specific embodiments in connection with the accompanying drawings.

DETAILED DESCRIPTION

Figure 1:
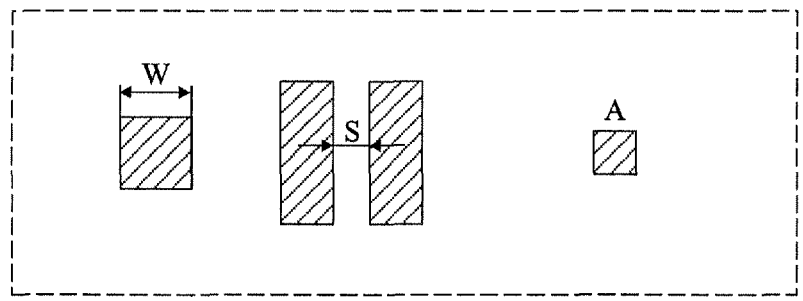
FIG. 1 illustrates examples of rules that may be imposed to integrated circuit designers to form different elements of electronic components on a same level.
Figure 2:
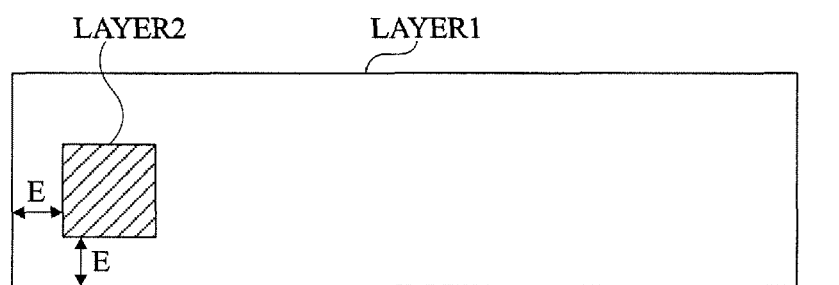
FIG. 2 illustrates examples of rules that may be imposed to integrated circuit designers for the forming of different elements of electronic components which require the use of several mask levels for their manufacturing.
Figure 2:
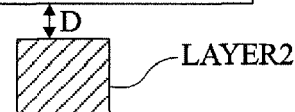
Figure 3:
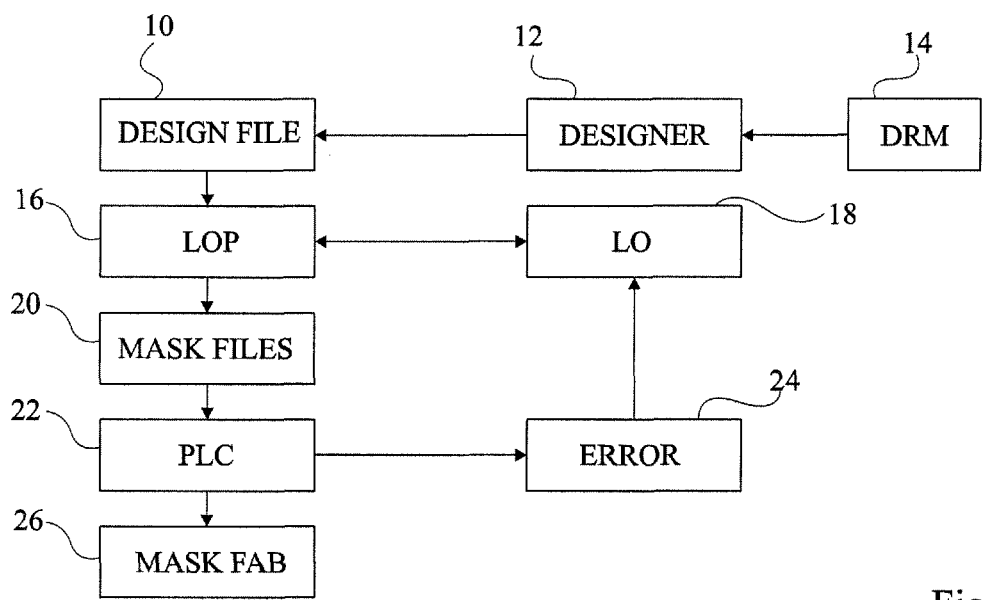
FIG. 3 is a flowchart illustrating steps currently carried out between the design of integrated circuit files and the manufacturing of the masks for manufacturing the integrated circuits.
Figure 4:
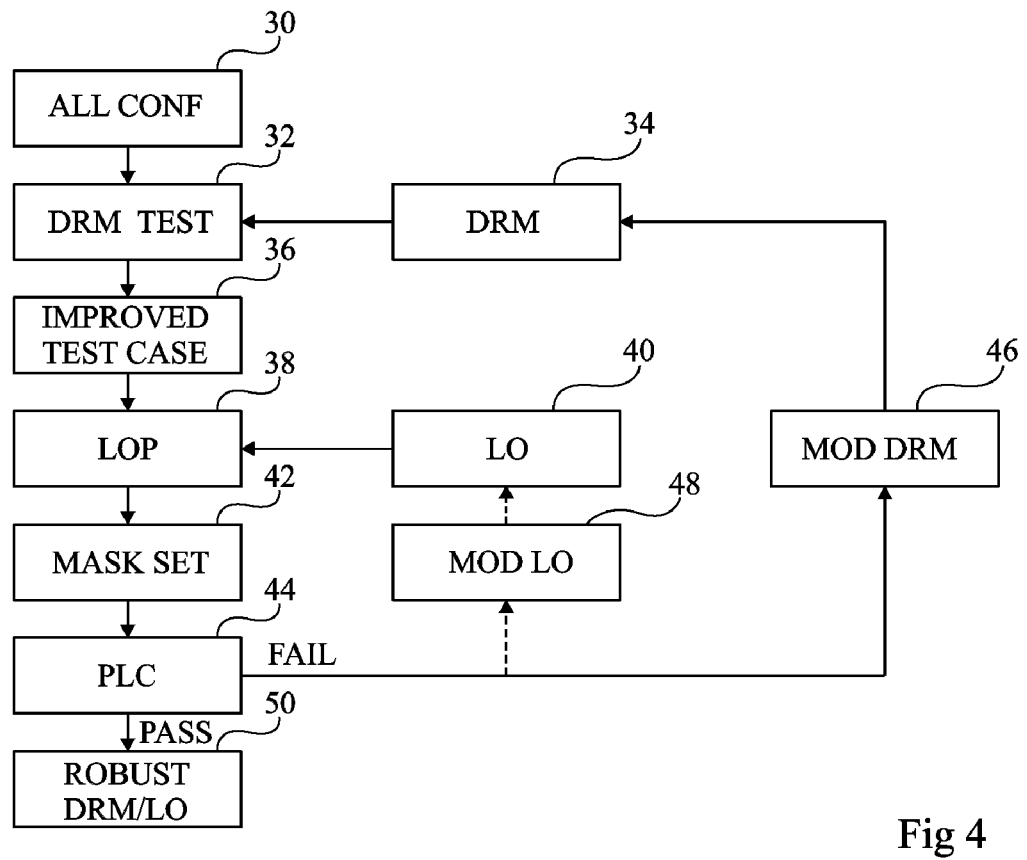
FIG. 4 is a flowchart illustrating steps according to an embodiment of the present invention.

FIG. 4 is a flowchart of a method provided to improve the design of integrated circuit masks, and especially when new components are provided by integrated circuit designers. More specifically, this drawing illustrates steps of a method for performing efficient and robust integrated circuit file tests, to avoid that erroneous masks are formed based on new components which comply with conventional tests.

The method described in relation with the flowchart of FIG. 4 will preferably be followed for each new electronic component technology. This method enables defining optimized integrated circuit design rules which may, later on, be adapted to any new component in the considered technology.

The method of FIG. 4 starts with a step 30 (ALL CONF) of forming of a complete test file. This complete test file comprises all the possible configurations of the various elements of a given technology (doped wells, metal tracks, etc.), be they known and existing configurations or configurations which do not appear as achievable.

It should be noted that "all the possible configurations of the various available elements" means that the complete test file for example comprises a set of random configurations of all the elements available to the designer, or also a set of configurations generated by using mathematical models of interactions of segments or of polygons. Any other method of formation of such a complete test file, comprising many configurations of the elements available to the designers, may also be used.

The complete test file is then tested (step 32) by means of the design rules imposed in the DRMs associated with this technology (step 34) to form an improved test file (step 36, IMPROVED TEST CASE) comprising all the configurations of complete test file 30 less all the configurations which do not comply with the rules imposed by DRMs 34. Thus, the improved test file comprises all the configurations authorized by the DRMs of the considered technology, be they conventional configurations (currently used by designers) or unusual configurations which are not filtered by the DRMs.

The obtained improved test file 36 is then transformed, at a step 38 (LOP), by a set of logical operations 40 (LO) implemented by computing means, for example, a computer, and defined by technologists, to form a mask set (MASK SET) at a step 42.

The mask set obtained at step 42 is then submitted to a first visual test performed by a technologist, then to a mask post-generation test at a step 44 (PLC). The mask post-generation test 44 enables verifying that the obtained masks comply not only with the dimensional requirements of mask manufacturers, but also with the requirements of integrated circuit manufacturers.

If an error is detected during one of the tests of step 44 (FAIL), and this error corresponds to a case which should not be reproduced afterwards in the considered technology, it is provided to report the specific case having caused the error directly at the level of design rules 34, at a step 46 (MOD DRM). Thus, such a situation can not be allowed afterwards by the test performed by means of the DRMs, for new integrated circuits.

If the detected error does not correspond to a case to be forbidden afterwards for new circuits, in the considered technology, or corresponds to a case to be refined and/or verified differently, it may be provided, at a step 48 (MOD LO), to modify the logical operations 40 performed at step 38.

The set of steps 32, 36, 38, 42, and 44 is then repeated as often as necessary until a mask post-generation test step 44 providing no error is obtained (PASS). In this case, it is proceeded to a step 50 (ROBUST DRM/LO) where it can be said that the subsequent integrated circuit configurations authorized by the modified DRMs will provide high-quality and error-free mask files. The mask files thus obtained will be adapted to the manufacturing of high-quality and error-free integrated circuits.

It should be noted that the tests of mask post-generation test step 44 may also be modified and adapted when steps 32 to 42 are repeated. For example, some test steps may be modified and made less demanding if such a requirement appears not to be necessary.

Indeed, if a new integrated circuit is provided by the designers, this circuit will follow the conventional methods of transformation of the integrated circuit into a corresponding mask file for the integrated circuit manufacturing.

Figure 5:
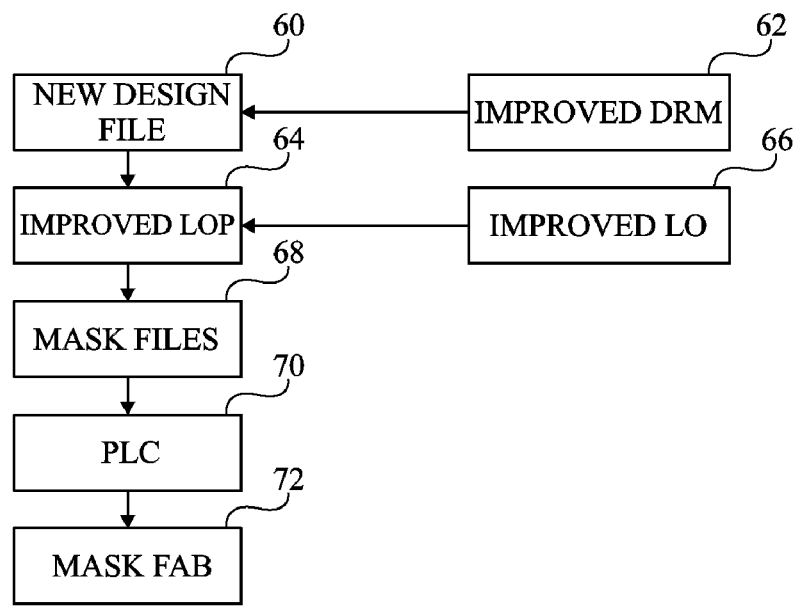
FIG. 5 is a flowchart illustrating steps of the manufacturing of integrated circuit masks according to an embodiment of the present invention.

FIG. 5 illustrates the timing diagram of such a method. A new integrated circuit design file (NEW DESIGN FILE) is created at a step 60 by the integrated circuit designers. This integrated circuit design file complies with the integrated circuit design rules imposed by the improved design rule manuals formed by the method of FIG. 4 (IMPROVED DRM, step 62).

The integrated circuit file is then transformed, in a step 64 (IMPROVED LOP), by the improved logical operations formed by the method of FIG. 4 (step 66, IMPROVED LO). The mask file thus obtained may be tested again with the mask post-generation steps, at a step 70 (PLC). If such a test is provided, the modified test will preferably be used on repeating of the method of FIG. 4, if it has been modified. A mask set is thus obtained at a step 72 (MASK FAB), the masks being of good quality.

Thus, once the method described in relation with FIG. 4 has been carried out, any new integrated circuit file can be transformed into a mask file without fearing errors in the masks since the method described in relation with FIG. 4 has eliminated all forbidden design configurations.

Specific embodiments of the present invention have been described. Various alterations, modifications and improvements will occur to those skilled in the art. In particular, any other test step generally provided in addition to the steps disclosed herein for the manufacturing of integrated circuit masks may be carried out in combination with the method steps disclosed herein.

It should be noted that, conventionally, the complete test file, the improved test file, the mask files, and the integrated circuit design files may be formed in the GDSII file format, currently used for such files. It should however be noted that any other integrated circuit file format (for example, OASIS) may be used to form these files.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method for designing masks adapted to the forming of integrated circuits in a considered technology, comprising the steps of:
   (a) forming a first test file comprising a set of randomly-generated configurations of integrated circuit elements not known to comply with design rule manuals;
   (b) forming a second test file comprising all the elements of the first test file, less the elements corresponding to configurations forbidden by design rule manuals;
   (c) transforming the second test file by means of a set of logical operations implemented by computing means to obtain a first mask file representative of a set of masks necessary to obtain an integrated circuit associated with the second test file;
   (d) testing, post generation, the first mask file for compliance with predetermined criteria and, if a post-generation test result is negative, modifying and adapting the design rule manuals and/or the logical operations according to the post-generation test result; and
   (e) reiterating steps (b) to (d) as many times as necessary until the post-generation test result of step (d) is positive.

2. The method of claim 1 wherein step (d) further comprises the step of modifying and adapting the logical operations of transformation of the second test file if the negative test result does not correspond to a case to be forbidden for new circuits.

3. The method of claim 2, wherein step (d) further comprises the step of modifying and adapting the post-generation test of the first mask file.

4. The method of claim 3, wherein step (e) is followed by the step of:
   (f) forming an integrated circuit file respecting the rules imposed by the modified and adapted design rule manuals obtained by the last reiteration of step (d); and
   (g) transforming the integrated circuit file into a second mask file by applying the logical operations modified and adapted at step (d).

5. The method of claim 4, wherein step (g) is followed by a step of manufacturing of a set of integrated circuit masks based on the second mask file obtained at step (g).

6. The method of claim 1 wherein the predetermined criteria comprise dimensional requirements set by mask manufacturers.

7. The method of claim 1, wherein the predetermined criteria comprise requirements set by integrated circuit manufacturers.

8. The method of claim 1, wherein the randomly-generated configurations include configurations representative of a new circuit component.

9. A method for designing masks adapted to the forming of integrated circuits in a considered technology, comprising the steps of:
   (a) forming a first test file comprising a set of configurations of integrated circuit elements not known to comply with design rule manuals, wherein the configurations are generated by using mathematical models of interaction of segments or of polygons;
   (b) forming a second test file comprising all the elements of the first test file, less the elements corresponding to configurations forbidden by design rule manuals;
   (c) transforming the second test file by means of a set of logical operations implemented by computing means to obtain a first mask file representative of a set of masks necessary to obtain an integrated circuit associated with the second test file;
   (d) testing, post generation, the first mask file for compliance with predetermined criteria and, if a post-generation test result is negative, modifying and adapting the design rule manuals and/or logical operations according to the post-generation test result; and
   (e) reiterating steps (b) to (d) as many times as necessary until the post-generation test result of step (d) is positive.

10. The method of claim 9, wherein step (d) further comprises the step of modifying and adapting the logical operations of transformation of the second test file if the negative test result does not correspond to a case to be forbidden for new circuits.

11. The method of claim 10, wherein step (d) further comprises the step of modifying and adapting the post-generation test of the first mask file.

12. The method of claim 11, wherein step (e) is followed by the step of:
   (f) forming an integrated circuit file respecting the rules imposed by the modified and adapted design rule manuals obtained by the last reiteration of step (d); and
   (g) transforming the integrated circuit file into a second mask file by applying the logical operations modified and adapted at step (d).

13. The method of claim 12, wherein step (g) is followed by a step of manufacturing of a set of integrated circuit masks based on the second mask file obtained at step (g).

14. A system for generating integrated circuit mask files comprising:
   a processor;
   a test file generator configured to generate a test file comprising a comprehensive set of configurations of integrated circuit elements not known to comply with design rule manuals;
   a design rules manual test section configured to subject the test file to constraints imposed by the design rule manuals and remove from the test file configurations that do not comply with the design rule manuals to produce a revised test file;
   a mask file transformer configured to transform, using logical operations for mask transformation, the revised test file to produce a mask file representative of a set of masks for patterning an integrated circuit associated with the revised test file; and
   a post-generation test section configured to subject the mask file to predetermined criteria and, if the mask file fails to meet the predetermined criteria, provide for modification of the design rule manuals and/or logical operations, wherein the processor is configured to cause repeated execution of subjecting the test file to constraints imposed by the design rule manuals, transforming the revised test file, subjecting the mask file to predetermined criteria, and providing for modification of the design rule manuals and/or logical operations until the predetermined criteria are met.

15. The system of claim 14, wherein the test file includes configurations for a new circuit component.

16. The system of claim 14, wherein the test file includes randomly generated configurations of integrated circuit elements.

17. The system of claim 14, wherein the test file includes configurations generated by using mathematical models of interaction of segments or of polygons.

18. The system of claim 14, wherein the predetermined criteria comprise dimensional requirements set by mask manufacturers.

19. The system of claim 14, wherein the predetermined criteria comprise fabrication requirements set by integrated circuit manufacturers.

20. The system of claim 14, wherein the processor is further configured to provide for modification of the post-generation test section.

* * * * *